United States Patent
Kurano

(10) Patent No.: US 6,899,457 B2
(45) Date of Patent: May 31, 2005

(54) THERMISTOR TEMPERATURE SENSOR

(75) Inventor: Atsushi Kurano, Kuwana (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/093,504

(22) Filed: Mar. 11, 2002

(65) Prior Publication Data

US 2002/0131477 A1 Sep. 19, 2002

(30) Foreign Application Priority Data

Mar. 14, 2001 (JP) ........................................ 2001-072446

(51) Int. Cl.[7] .............................................. H01C 1/028
(52) U.S. Cl. ........................................ 374/185; 338/28
(58) Field of Search .................. 29/612, 613; 374/185, 374/208, 183, 184, 163; 338/28, 25, 22 R, 225 D

(56) References Cited

U.S. PATENT DOCUMENTS

| | | | | |
|---|---|---|---|---|
| 3,832,668 A | * | 8/1974 | Berman | 338/22 SD |
| 3,913,058 A | * | 10/1975 | Nishio et al. | 338/28 |
| 4,243,968 A | * | 1/1981 | Scott | 338/28 |
| 4,447,799 A | * | 5/1984 | Carlson | 338/22 R |
| 4,538,927 A | * | 9/1985 | Jochemczyk et al. | 374/163 |
| 4,934,831 A | * | 6/1990 | Volbrecht | 338/28 |
| 4,937,552 A | * | 6/1990 | Lam | 338/28 |
| 5,462,359 A | * | 10/1995 | Reichl et al. | 374/208 |
| 5,749,656 A | * | 5/1998 | Boehm et al. | 374/185 |
| 6,130,598 A | * | 10/2000 | Katsuki et al. | 338/28 |
| 6,306,315 B1 | * | 10/2001 | Ogata et al. | 338/22 R |
| 6,466,123 B1 | * | 10/2002 | Kuzuoka et al. | 338/25 |
| 6,501,366 B2 | * | 12/2002 | Takahashi et al. | 338/25 |
| 6,698,922 B2 | * | 3/2004 | Adachi et al. | 374/208 |

FOREIGN PATENT DOCUMENTS

| | | | | |
|---|---|---|---|---|
| DE | 19901935 A1 | * | 10/1999 | G01K/1/14 |
| JP | 10318850 A | * | 12/1998 | G01K/7/22 |
| JP | 11-218449 | | 8/1999 | |
| JP | 12-88673 | | 3/2000 | |

* cited by examiner

Primary Examiner—Stanley J Pruchnic
(74) Attorney, Agent, or Firm—Nixon & Vanderhye PC

(57) ABSTRACT

An insulator 6 for holding electrode wires 4 is provided between a thermistor element 3 and a sheathed pin 5 which is a wiring, and the electrode wires 4, which are inserted into hole portions 6a of the insulator 6, are held therein not bonded to the insulator, whereby the vibration resistance of the electrode wires of the thermistor element is improved so that breaking of the electrode wires is prevented.

5 Claims, 5 Drawing Sheets

THERMISTOR TEMPERATURE SENSOR

BACKGROUND OF THE INVENTION

1. Field of the Invention

The present invention relates to a temperature sensor in which a thermistor element is supported on a wiring (a sheathed pin) for taking out a thermistor signal to the outside by joining electrode wires of the thermistor element to the wiring.

2. Description of the Related Art

Conventionally, a temperature sensor of this kind is proposed in Japanese Unexamined Patent Publication (Kokai) No. 2000-88673. The temperature sensor comprises a thermistor element, electrode wires led from the thermistor element for detecting a thermistor signal and a wiring (a sheathed pin) for taking out the thermistor signal so detected to the outside, and in the temperature sensor, the thermistor element is supported on the wiring by joining the electrode wires to the wiring.

Incidentally, the aforesaid conventional temperature sensor is constructed such that a ceramic molded body is disposed around an outer circumference of the thermistor element with a gap being provided between the thermistor element and the ceramic molded body and, furthermore, that an outer circumference of the ceramic molded body is covered with a metallic cover.

Namely, since the thermistor element, that is joined to and supported on the wiring, resides in a state in which the thermistor element floats within the metallic cover, in case vibrations are applied to the temperature sensor, a load is applied to the electrode wires which support the thermistor element, leading to a risk that the electrode wires will break.

To cope with this problem, it has been proposed to fill the interior of the ceramic molded body housing the thermistor element with an inorganic adhesive so as to fix the thermistor element and the electrode wires. In this case, however, when the temperature becomes high, a tensile stress is applied to the electrode wires due to the difference in linear expansion coefficient between the electrode wires and the inorganic adhesive bonded to the electrode wires, this also leading to the risk that the electrode wires will break.

SUMMARY OF THE INVENTION

Accordingly, the present invention has been developed in view of the above problem, and an object thereof is to provide a temperature sensor in which a thermistor element is supported on a wiring for taking out a thermistor signal to the outside by joining electrode wires of the thermistor element to the wiring, so that the vibration resistance of the electrode wires of the thermistor element is improved so as to prevent breaking of the electrode wires.

With a view to attaining the above object, according to the present invention, there is provided a temperature sensor comprising a thermistor element (3), electrode wires (4) led from the thermistor element for detecting a thermistor signal and a wiring (5) for taking out the thermistor signal so detected to the outside, wherein the thermistor element is supported on the wiring by joining the electrode wires to the wiring, the temperature sensor being characterized in that at least parts of the electrode wires are supported in a non-bonded state by an insulator (6).

According to the present invention, since the electrode wires are held by the insulator, even in case vibrations are applied to the sensor, the electrode wires are prevented from vibrating, whereby the vibration resistance of the electrode wires is improved. In addition, since the insulator is a molded body and is not bonded to the electrode wires, there is no case where a tensile stress is applied to the electrode wires from the insulator when the temperature becomes high.

The present invention may be more fully understood from the description of preferred embodiments of the invention, as set forth below, together with the accompanying drawings.

BRIEF DESCRIPTION OF THE DRAWINGS

In the drawings:

FIG. 4A is a graph showing the result of a vibration resistance test carried out at 900° C. with no such insulator being present, whereas

FIG. 5A is a graph showing the result of a vibration resistance test carried out at 1000° C. with no such insulator being present, whereas

DESCRIPTION OF THE PREFERRED EMBODIMENTS

Figure 1:
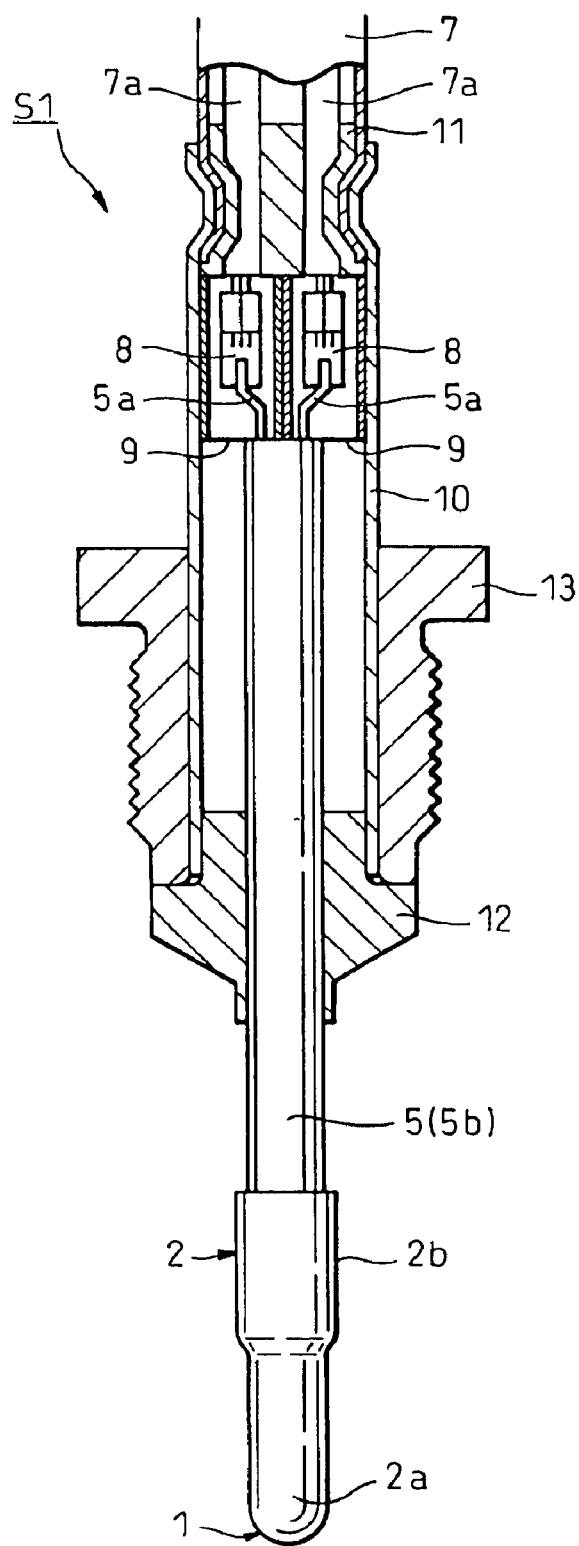
FIG. 1 is a partial sectional view showing the overall construction of a temperature sensor according to an embodiment of the invention.
Figure 2:
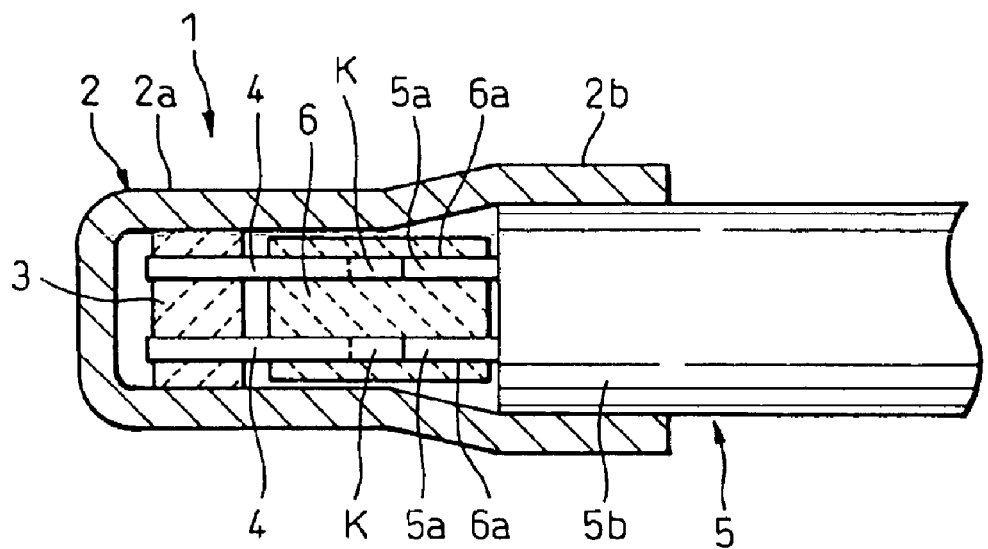
FIG. 2 is an enlarged sectional view showing a temperature-sensing portion of the temperature sensor shown in FIG. 1.

The present invention will be described below based on embodiments illustrated in the accompanying drawings. FIG. 1 shows the overall construction of a temperature sensor S1 according to an embodiment of the present invention, in which the temperature sensor is shown in cross section except for a temperature-sensing portion 1 thereof. In addition, FIG. 2 is an enlarged sectional view of the temperature-sensing portion 1 shown in FIG. 1. The temperature sensor S1 is mounted, for example, in an exhaust system of an automobile for use as an exhaust gas temperature sensor.

Firstly, referring mainly to FIG. 2, the temperature-sensing portion 1 will be described. Reference numeral 2 denotes a metallic cover made of a metal such as stainless steel which is superior in heat resistance, and in this embodiment, the metallic cover 2 is formed into a stepped cylindrical shape having a bottom portion at one end and an opening at the other end thereof. A thermistor element 3 is housed in the metallic cover 2 at one end thereof (the end where the bottom portion is provided).

In this embodiment, the thermistor element 3 can endure use at high temperatures (for example, 800° C. or higher) and is a cylindrical sintered molded body made of a semiconductor material (thermistor material) comprising (Y—Cr—Mn)O—$Y_2O_3$ as a main constituent.

In addition, a pair of electrode wires 4 is connected to the thermistor element 3 for detecting a thermistor signal (an output signal employing resistance (R)–temperature (T) characteristics). The electrode wires 4 comprise a noble metal wire such as platinum, a dumet wire or a copper wire and are connected to the thermistor element 3 by being secured thereto through shrink fitting when the thermistor element 3 is sintered.

In this embodiment, the respective electrode wires 4 are spaced apart from each other in parallel and are led from the thermistor element 3 in such a manner as to extend toward the other end (the end where the opening is provided) of the metallic cover 2 along the axis of the metallic cover 2. In addition, in this embodiment, platinum wires are used for the respective electrode wires 4.

Additionally, at the other end (the end where the opening is provided) of the metallic cover 2, a sheathed pin 5, which functions as a wiring for taking out a thermistor signal from the electrode wires 4 to the outside, is inserted into the metallic cover 2 from the opening thereof. This sheathed pin 5 is constructed such that a pair of core wires 5a made of a metal such as stainless steel is housed in an outer tube 5b made of a metal such as stainless steel and that insulation powder made of magnesia is filled between the core wires 5a and the outer tube 5b.

This sheathed pin 5 and the metallic cover 2 are joined and fixed to each other by caulking the metallic cover 2 at the other end thereof around the outer tube 5b of the sheathed pin 5 and welding the caulked portion around the full circumference thereof, whereby the thermistor element 3 housed in the metallic cover 2 is prevented from being exposed to the outside environment.

Then, at the end of the metallic cover 2 where the sheathed pin 5 is inserted into the metallic cover 2, the core wires 5a protrude from the outer tube 5b, and the respective core wires 5a which so protrude, are made to overlap the pair of electrode wires 4, whereby the pair of core wires 5a are joined to the pair of electrode wires 4 by resistance welding or laser welding the overlapped portions (joint portions K in FIG. 2). Then, both the wires 4, 5a are electrically connected to each other via the joint portions K.

Here, as shown in FIG. 2, an insulator 6 is provided between the thermistor element 3 and an end portion of the outer tube 5b of the sheathed pin 5 for holding the pair of electrode wires 4. The insulator 6 has a pair of hole portions 6a in which the electrode wires 4 are inserted, respectively, so that the electrode wires 4 so inserted are supported in the hole portions 6a, respectively. The construction of the insulator itself is shown in FIG. 3.

Figure 3:
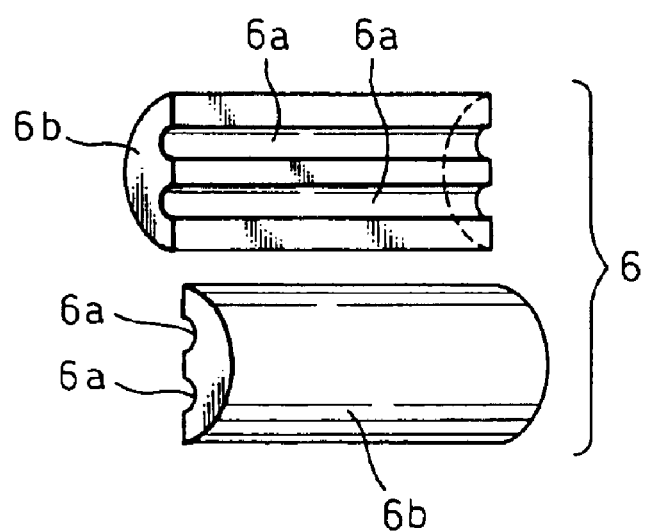
FIG. 3 is a diagram showing a state in which a single insulator shown in FIG. 2 is divided.

As shown in FIG. 3, in this embodiment, the insulator 6 is a cylindrical insulating tube made of alumina or mullite which has substantially the same linear expansion coefficient as that of platinum which constitutes the electrode wires 4 in this embodiment, and internal holes (through holes) of the insulating tube are constructed as the hole portions 6a. The insulator 6 is constructed by assembling together two divided portions 6b which are divided into two at a position corresponding to the hole portions 6a along the axes of the hole portions 6a.

Then, the electrode wires 4 and the core wires 5a are inserted and disposed in the hole portions 6a of the insulator 6 together with the joint portions K of the electrode wires 4 and the core wires 5a so as to be held therein by the insulator 6, whereby the electrode wires 4 and the core wires 5a are electrically insulated from the metallic cover 2. Here, the wires 4, 5a and the joint portions K are not bonded to the insulator 6 in the hole portions 6a thereof, so that they are allowed to move within the range of space inside the hole portions 6a, respectively.

In addition, the metallic cover 2 is drawn such that the diameter thereof is reduced via a stepped portion from the other end (the end where the opening is provided) toward the one end (the end where the bottom portion is provided) thereof. In other words, of the metallic cover 2 a portion which houses the thermistor element 3, is formed into a small diameter portion 2a whereas a portion situated at the end thereof where the metallic cover 2 is joined to the sheathed pin 5, is formed into a large diameter portion 2b.

Additionally, as shown in FIG. 1, an opposite end portion of the sheathed pin 5 to the end thereof, where the sheathed pin 5 is connected to the temperature-sensing portion 1, is electrically connected to a wiring member 7 for external connection. This external connection wiring member 7 is constructed so as to be electrically connected to an external circuit, not shown, and the temperature sensor S1 and the external circuit are able to communicate with each other via this external connection wiring member 7 in order to exchange signals.

Respective lead wires 7a of the external connection wiring member 7 are electrically connected to the respective core wires 5a of the sheathed pin 5 via connecting terminals 8. For example, the core wires 5a of the sheathed pin 5 are jointed to the connecting terminals, respectively, by welding whereas the lead wires 7a of the external connection wiring member 7 are joined to the connecting terminals, respectively, by crimping the connecting terminals 8.

In addition, joint portions of the lead wires 7a of the external connection wiring member 7 and the core wires 5a of the sheathed pin 5 are each covered with a resin tube 9 made of a heat-resistant resin for protection. A joint portion of the external connection wiring member 7 including the resin tubes 9 and the sheathed pin 5, as well as a portion of the sheathed pin 5 between the connecting portion thereof at the temperature-sensing portion side and the connecting portion thereof at the external connection wiring member side is covered with a metallic tube 10 for protection.

This metallic tube 10 is caulked and fixed to the external connection wiring member 7 via a rubber bush 11 provided in the external connection wiring member 7 at an end where the metallic tube 10 is connected to the external connection wiring member 7. In addition, a rib 12 is fitted on the sheathed pin 5 for holding it and is fixed thereto by caulking and welding.

The metallic tube 10 is fitted on this rib 12 and is fixed thereto by caulking and welding. A threaded member (a mounting member) 13 is provided in such a manner as to pass onto the metallic tube 10, and since the threaded member 13 is free on the metallic tube 10, the threaded member 13 can be thread connected to a mounting portion of the sensor S1 with ease.

This temperature sensor S1 can be assembled, for example, in the following manner. The respective portions are caulked or welded accordingly as described above.

The sheathed pin 5 and the external connection wiring member 7 are connected to each other via the connecting terminals 8, and the metallic tube 10, the rib 12 and the threaded member 13 are mounted around the outer circumference of the sheathed pin 5. On the other hand, the electrode wires 4 of the thermistor element 3 are connected to the core wires 5a of the sheathed pin 5, and the electrode wires 4, the core wires 5a and the joint portions K are assembled in the insulator 6 in such a manner that they are sandwiched between the divided portions 6b of the insulator 6.

Then, the thermistor element 3, to which the insulator 6 is so assembled, is inserted into the metallic cover 2 which is formed into the stepped shape by drawing, and the metallic cover 2 and the outer tube 5b of the sheathed pin 5 are fixed to each other. Thus, the temperature sensor S1 shown in FIG. 1 is completed.

This temperature sensor S1 is inserted into, for example, a mounting hole (not shown) formed in an exhaust pipe of an automobile, and the temperature sensor S1 is positioned in place through the abutment between the rib 12 and the mounting hole and is then mounted to the exhaust pipe by being thread connected into the mounting hole via the threaded member 13.

Then, when a fluid (such as exhaust gas) to be measured comes into contact with the temperature-sensing portion 1 which protrudes into the exhaust pipe, a signal corresponding to the temperature of the fluid to be measured is designed to be outputted to the outside via the electrode wires 4, the sheathed pin 5 and the external connection wiring member 7 as a signal from the thermistor element 3.

As has been described heretofore, this embodiment is mainly characterized in that by joining the respective electrode wires 4 to the sheathed pin (a wire) 5, the electrode wires 4 are held by the insulator 6 in a non-bonded state between the thermistor element 3 and the sheathed pin 5 at the temperature sensor S1 in which the thermistor element 3 is supported on the sheathed pin 5.

According to the embodiment, since the respective electrode wires 4 are held by the insulator 6, even in case vibrations (for example, vibrations of the automobile) are applied to the sensor S1, the electrode wires 4 are prevented from vibrating, whereby the vibration resistance of the electrode wires 4 is improved.

Figure 4B:
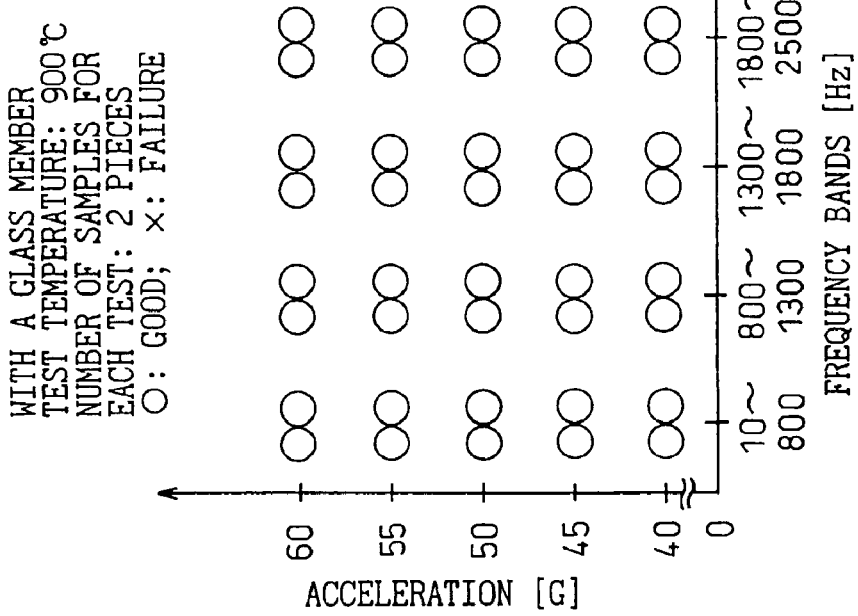
FIG. 4B is a graph showing the result of a vibration test carried out at 900° C. with the insulator being present.

Here, specific results of evaluation of improvement in vibration resistance will be illustrated below. A sample provided with the insulator 6 as in the case of this embodiment was prepared, whereas a sample without the insulator 6 was prepared as a comparison example. Vibration resistance tests were carried out on those samples at temperatures of 900° C. and 1000° C. by applying accelerations to the samples at various frequency areas (frequency bands). The results of the tests carried out at 900° C. are illustrated in FIGS. 4A, 4B, and the results of the tests carried out at 1000° C. are illustrated in FIGS. 5A, 5B.

Figure 4A:
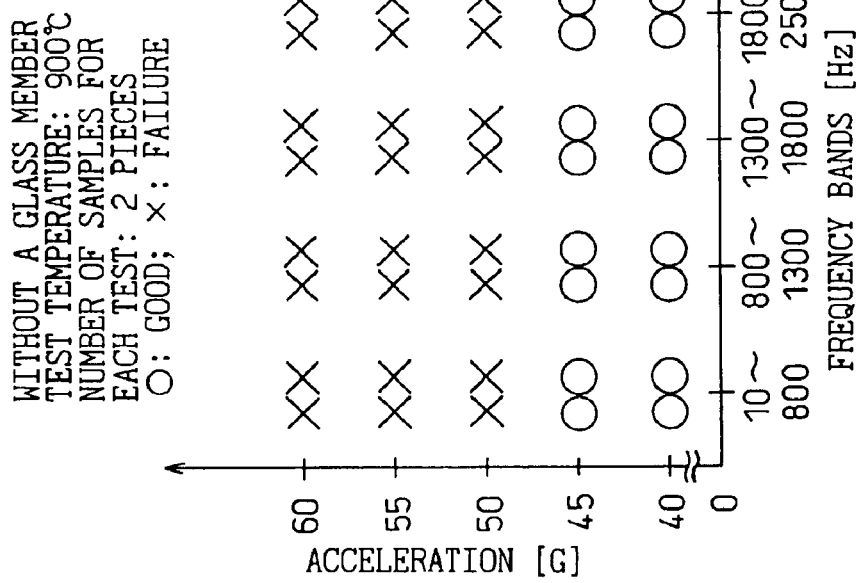
Figure 5A:
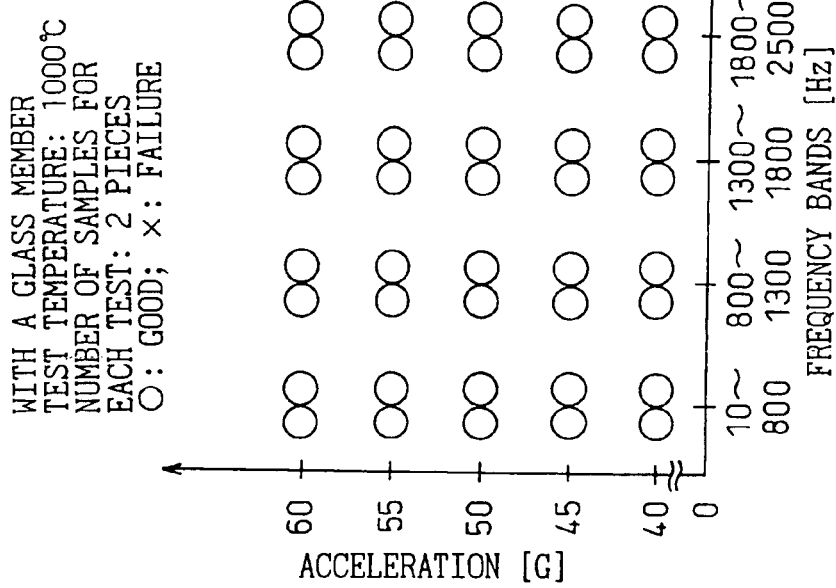
Figure 5B:
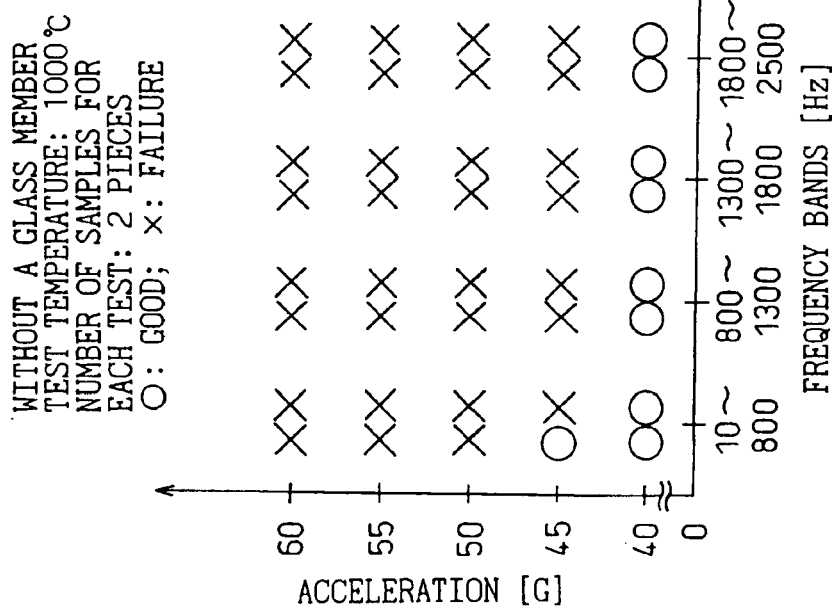
FIG. 5B is a graph showing the result of a vibration test carried out at 1000° C. with the insulator being present.

As shown in FIG. 4A, in the sample without the insulator, the electrode wires did not break up to 45 G throughout the entire frequency areas at 900° C., but broke when the acceleration reached 50 G. In contrast, as shown in FIG. 4B, in the sample with the insulator as in the case of the embodiment of the invention, the vibration resistance was improved such that the electrode wires did not break up to 60 G throughout the entire frequency areas. The acceleration of 60 G was the maximum G of a testing machined used in the tests. In addition, similar evaluation results were obtained from similar tests carried out at 1000° C.

Additionally, the insulator 6 is a ceramic molded body and is not bonded to the electrode wires 4, which is different from the aforesaid conventional example in which the electrode wires are fixed with the inorganic adhesive. Owing to this, even if there is a difference in linear expansion coefficient between the respective electrode wires 4 and the insulator 6, the movements of the electrode wires 4 and the insulator 6 due to thermal expansion (or thermal shrinkage) become independent from each other, and therefore, there is almost no case where stress is applied to the respective electrode wires 4 due to the movement of the insulator 6 resulting from thermal expansion (or thermal shrinkage).

Consequently, according to this embodiment, since there is almost no case where tensile stress is applied from the insulator 6 to the respective electrode wires 4 when the temperature is high, the vibration resistance of the electrode wires 4 of the thermistor element 3 can be improved to thereby prevent breaking of the electrode wires 4. Note that in this embodiment as a preferred mode an insulator is adopted as the insulator 6 which comprises alumina or mullite which has substantially the same linear expansion coefficient as that of the electrode wire (platinum wires) 4. However, in this embodiment, glass may be adopted as the material of the insulator.

Additionally, adopted in this embodiment as the insulator 6 is the construction which has the hole portions 6a into which the electrode wires 4 are inserted so as to be supported therein and which is constructed by assembling together the two divided portions 6b which are divided into the two halves at the hole portions 6a. According to this construction, as has been described above, the insulator 6 can be assembled to the electrode wires 4 with ease after the electrode wires 4 have been joined to the core wires 5a of the sheathed pin 5.

Figure 6:
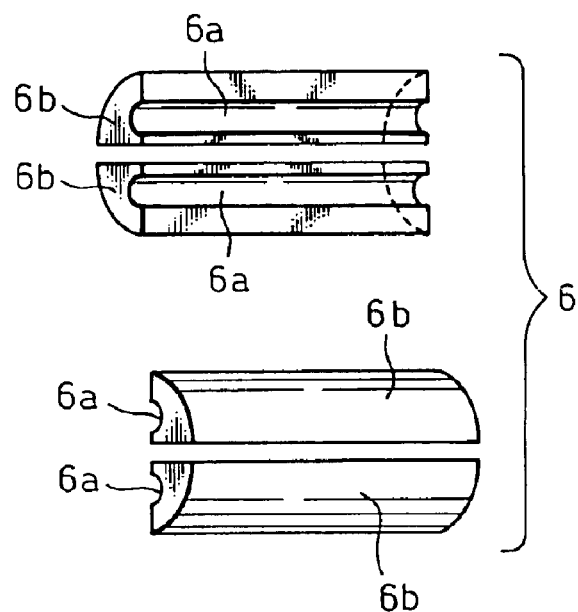
FIG. 6 is a diagram showing a modified insulator.

Here, instead of the aforesaid two divided portions 6a (two insulator halves), four divided portions 6b (four insulator quarters) may be used as the insulator 6 which are divided, as shown in FIG. 6, at two hole portions 6a and between the hole portions 6a along the axes of the hole portions 6a.

In addition, the insulator 6 does not always have to be the insulating tube that is divided as described above but may be an insulating tube which is formed as an integral body. In this case, for example, the electrode wires 4 and the core wires 5a of the sheathed pin 5 are inserted from the respective ends of the hole portions 6a of the insulator 6, respectively and both the wires 4, 5a are allowed to overlap each other in the interior of the hole portions 6a, respectively.

Here, through holes are formed in advance in the insulator 6 at positions corresponding to the overlapped portions of both the wires 4, 5a in such a manner as to extend from the hole portions 6a to the surface of the insulator 6. Then, the overlapped portions are laser welded by irradiating laser beams through these holes, whereby the electrode wires 4 and the core wires 5a can be jointed together after the electrode wires 4 are assembled in the insulator 6.

Figure 7:
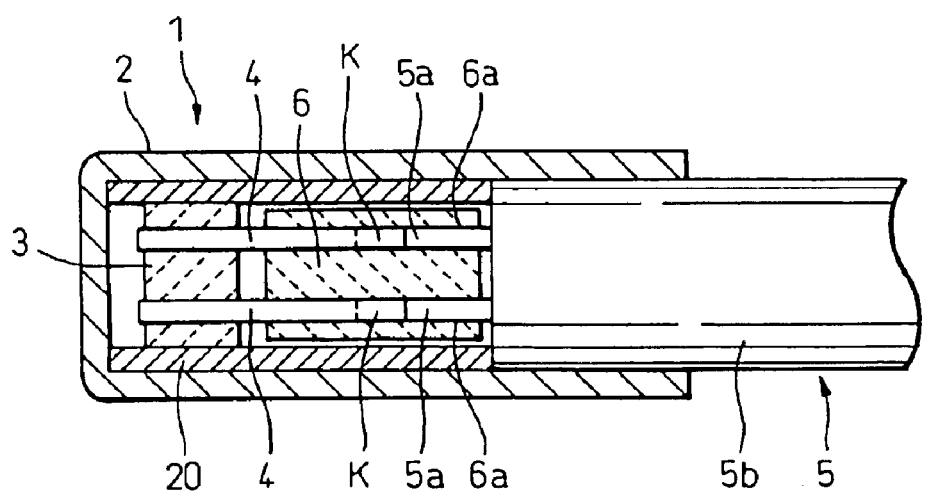
FIG. 7 is a sectional view showing a state in which a ceramic molded body is interposed between a metallic cover, and a thermistor element and the insulator.

Note that as shown in FIG. 7, a cylindrical ceramic molded body 20 which is something like one described in the aforesaid Japanese unexamined patent publication may be interposed to be set between the metallic cover 2, and the thermistor element 3 and the insulator 6. In this case, in the illustrated embodiment, the metallic cover 2 is not formed into the stepped cylindrical shape but is formed into a substantially straight cylindrical shape due to the increase in the thickness of the ceramic molded body 20.

In addition, while the thermistor element 3 is not protected, a construction may be adopted in which no metallic cover 2 is provided. Furthermore, the configuration of the insulator 6 may of any configuration as long as the insulator can hold the electrode wires and therefore is not limited to the configuration described in the above embodiment.

In summary, the gist of the invention resides in a temperature sensor in which the thermistor element is supported on the wiring by joining the electrode wires to the wiring, characterized in that the electrode wires are held between the thermistor element and the wiring in the non-bonded state by

What is claimed is:

1. A temperature sensor comprising:

a thermistor element;

electrode wires led from said thermistor element for detecting a thermistor signal, said electrode wires being made of platinum; and a wiring including core wires connecting electrically to said electrode wires for taking out said thermistor signal to the outside and an outer tube housing said core wires so that insulation powder is filled between said core wires and said outer tube;

wherein at least connecting portions of said electrode wires and said core wires are held in a non-bonded state between said thermistor element and said wiring by an insulator that comprises alumina or mullite, said insulator having hole portions into which said connecting portions are inserted, and wherein said connecting portions are supported in said hole portions, and said insulator is constructed by assembling together a plurality of divided portions which are divided at said hole portions.

2. A temperature sensor according to claim 1, said insulator having a cylindrical tube shape.

3. A temperature sensor according to claim 1, wherein the linear expansion coefficient of said insulator is the same as the linear expansion coefficient of said electrode wires.

4. A temperature sensor according to claim 3, wherein said insulator prevents said electrode wires from vibrating and said insulator does not apply tensile stress to said electrode wires.

5. A temperature sensor according to claim 1, wherein said insulator prevents said electrode wires from vibrating and said insulator does not apply tensile stress to said electrode wires.

* * * * *